July 19, 1927.
C. H. HAPGOOD
WEIGHING SCALE
Filed June 3, 1920    2 Sheets-Sheet 1
1,635,996
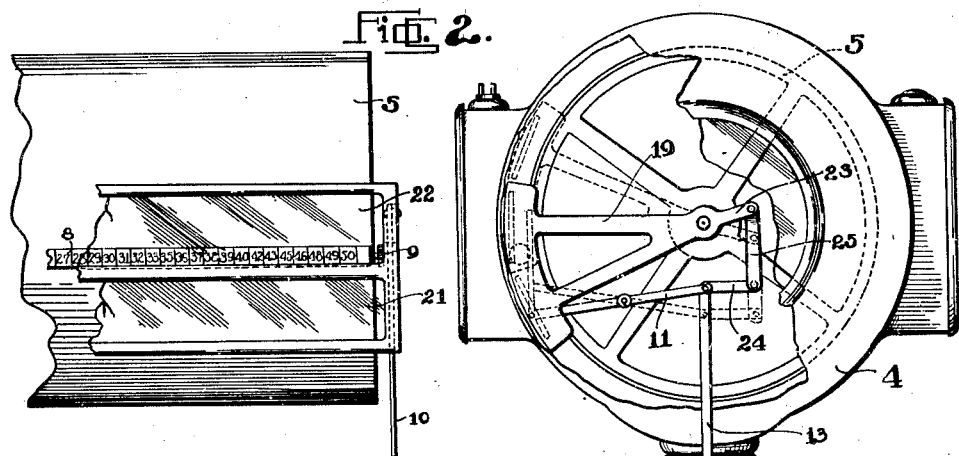
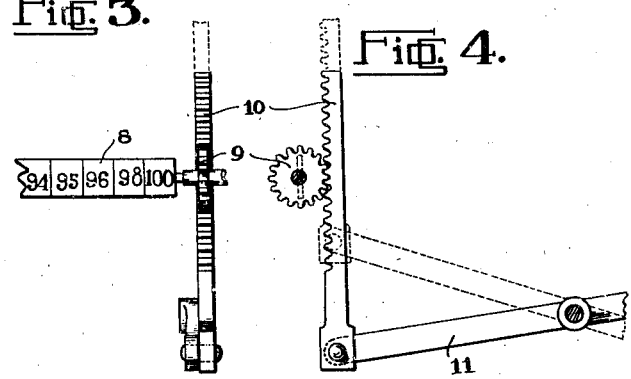
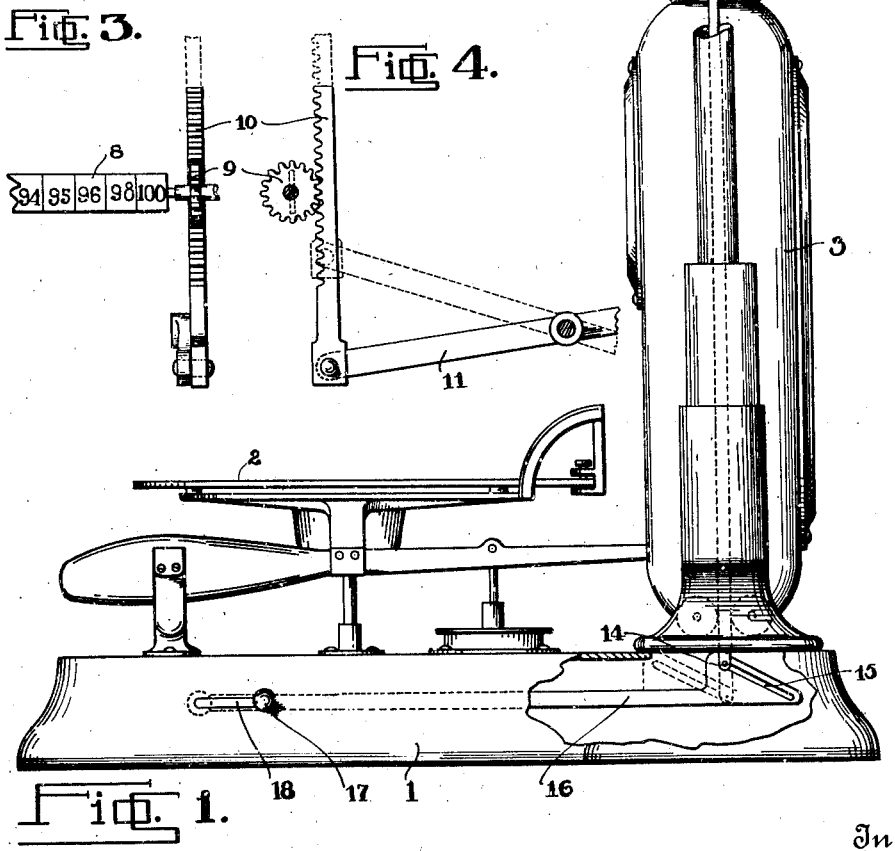
Inventor
Clarence H. Hapgood
By George R. Frye
Attorney July 19, 1927.

C. H. HAPGOOD

WEIGHING SCALE

Filed June 3, 1920

Inventor

CLARENCE H HAPGOOD.

By George R. Frye

Attorney

Patented July 19, 1927.

1,635,996

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed June 3, 1920. Serial No. 386,305.

This invention relates to weighing scales, and particularly to scales of the automatic type.

One of the principal objects is to provide means for increasing the price range of scales of this type without increasing the dimensions of the indicating mechanism or decreasing the size of the numerals or the spaces between the graduations.

Another object is to provide a weighing scale having an indicating chart with a plurality of sets of price values for each weight, the respective price values of each set being printed in optically dissimilar characters, whereby such characters may be selectively viewed.

Still other objects are the provision of novel means for selectively rendering such sets of characters legible, and the provision of novel means for changing the price range to agree with the values so brought into prominence.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is a side elevation of a weighing scale embodying a preferred form of my invention, parts being broken away;

Figure 2 is an enlarged fragmentary front elevation of an indicating cylinder with co-operating visibility screens;

Figure 3 is a fragmentary front elevation of the price range-changing mechanism employed in the scale shown in Figure 1;

Figure 4 is a fragmentary side elevation of the parts shown in Figure 3;

Figure 5:
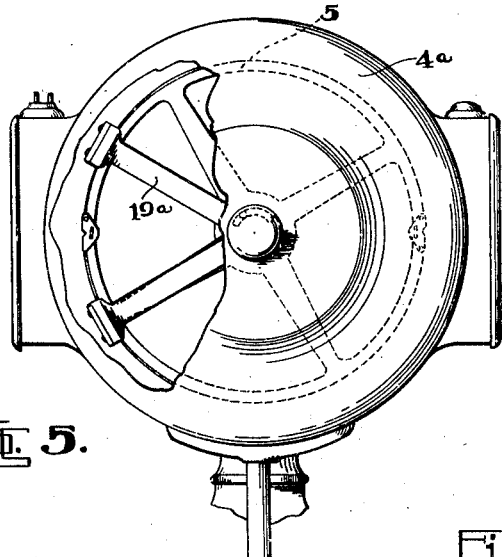
Figure 5 is a side elevation of a chart housing containing an indicator embodying my invention in slightly different form.

Although I have shown my invention in connection with a scale of the well-known cylinder type, it is to be understood that this showing is only illustrative, and that the invention is capable of embodiment in scales having other types of charts, either movable or fixed.

In the scale chosen for illustration, the base housing 1 contains the levers (not shown) which support the platform 2, and the upright casing 3 contains load-offsetting mechanism (not shown) of any preferred type, while the housing 4 contains a cylindrical chart 5 so connected to the lever mechanism of the scale as to be rotated when a load is placed upon the platform 2 in a degree proportional to the weight of the load.

Printed in two bands encircling the chart 5, preferably at its center, are weight characters 6 reversely arranged so that corresponding weight indications are shown at opposite sides of the housing 4 in the usual way. These characters may be printed in black.

The scale so far described is of well-known construction, and since my invention is not limited to any particular form of weighing or indicating mechanism, I have described it only in general terms.

Printed in columns or bands about the chart adjacent the bands of weight characters 6 are value graduations and characters 7 corresponding to various weights at various prices per pound. Each of these bands is provided with two sets of value characters, one of which is printed in one color, such as red, the other being printed in another color, such as green. The characters in green may be multiples of the respective superimposed characters in red, in which case there need be only one set of graduations, which may be printed in black. If the values indicated by the characters in one color are not multiples of the respective superimposed characters in the other color, the graduations corresponding to the superimposed characters will not register and two sets of graduations must be printed, one in each color.

In the form shown in Figures 1 to 4 inclusive, two price scales are inscribed upon a strip 8, one on each side thereof, the strip being rotatably mounted just below the reading line so that it is visible through the reading window in the front of the chart housing 4. Fixed at one end of the strip 8 is a pinion 9 which is engaged by a rack 10 carried at the end of a lever 11 pivoted within the housing 4. Some means, such as a light spring, is provided to hold the rack and pinion in mesh.

The opposite end of the lever 11 is connected to the upper end of a vertically-reciprocatory rod 13, the lower end of the rod 13 being provided with a pin 14 which is received in a cam slot 15 in a horizontally-movable member 16. The member 16 is provided with a knob 17 which projects through a slot 18 in the base housing 1. As illustrated, the cam slot is so arranged that by moving the knob 17 forwardly the rod 13 will be drawn downwardly, thereby rocking the lever 11 and turning the strip 8 to display the price characters upon its reversed side.

Pivotally mounted within the chart housing 4 is a frame 19 carrying a pair of color screens 21 and 22, the screen 21 being, for example, transparent to green light, and the screen 22 being transparent to red light. The frame is pivoted substantially upon the axis of rotation of the chart, and the screens are so arranged that by moving the frame 19 upon its pivot either screen may be brought between the chart and the reading window in the front of the chart housing 4. An arm 23 rigidly fixed to the frame 19 extends rearwardly from the pivot thereof, while an arm 24 rigidly fixed to the upper end of the rod 13 extends rearwardly therefrom, and the arms 23 and 24 are connected by means of a link 25 so that when the rod 13 is moved by means of the knob 17 the frame 19 is tilted to shift the color screens at the same time the price strip 8 is reversed.

The parts are so arranged that the scale of prices displayed is that corresponding to the values printed in red upon the chart when the green screen is in reading position. The green screen transmits only the green light from the unprinted surface of the chart and the green light from the green characters. The green characters and the background are thus both green when viewed through the green screen, so that the green characters blend with the apparently green background and are invisible. Since the green screen does not transmit the light from the characters printed in red, these characters appear black on the apparently green ground.

When the strip 8 is turned to display the price characters corresponding to the value characters printed in green, the red screen is simultaneously shifted to reading position, so that only the green value characters are visible, which now appear black against an apparently red background.

Figure 6:
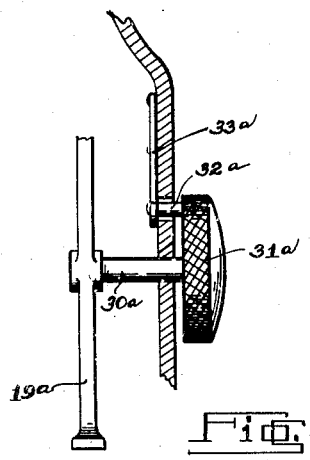
Figure 6 is an enlarged fragmentary elevation showing a knob for shifting the color screens employed.
Figure 8:
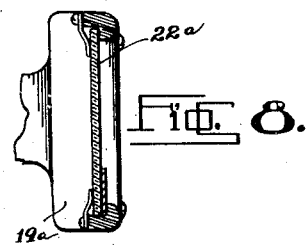
Figure 8 is a vertical section of the screen shown in Figure 7.
Figure 7:
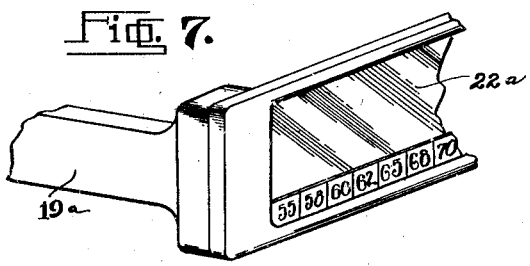
Figure 7 is an enlarged fragmentary perspective view of one of the color screens having a price scale attached thereto.
Figure 9:
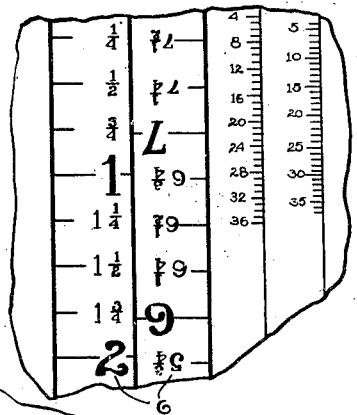
Figure 9 is a fragmentary diagrammatic view of the chart as viewed through one of the screens.
Figure 10:
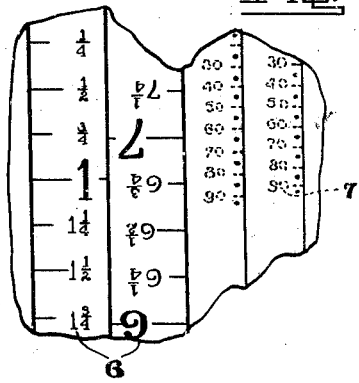
Figure 10 is a view of the same portion of the chart as viewed through the other screen.
Figure 11:
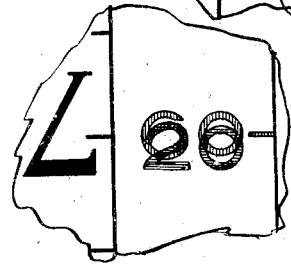
Figure 11 is a fragment of the chart viewed without a screen.

In the form shown in Figures 5 to 8 inclusive, the scale mechanism and the chart are the same as in the form above described. The price scales in this form are, however, carried upon the frame $19^a$ which supports the color screens. The price scale corresponding to the value characters printed in green is located at the lower edge of the screen $22^a$, which is transparent to red light (see Figures 7 and 8). The frame $19^a$ is pivoted in the chart housing $4^a$ by means of pins $30^a$, the axis of which lies in the axis of rotation of the chart. One of the pins $30^a$ is provided with a knurled knob $31^a$ located exteriorly of the housing. It is evident that by turning the knob the color screens with their co-operating price scales may be shifted into reading position. For the purpose of releasably retaining the frame $19^a$ in either position, I have mounted a detent $32^a$ upon a flat spring $33^a$ in position to project through the housing and snap into shallow recesses in the knob $31^a$, the sides of the recesses being inclined so that the detent slides out when the knob is manually turned. The portions of the screens which are located over the bands 6 of weight-indicating characters may, if desired, be omitted, though these characters, being printed in black, are visible through either screen. No screens are used on the back or customers' side of the chart housing, since only the weight is indicated on that side.

While it will be apparent that the illustrated embodiments of my scale herein shown are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a chart having a plurality of optically dis-similar sets of value characters, a scale for each set of characters, and means for selectively bringing each set of characters and its co-operating scale into prominence.

2. In a device of the class described, in combination, a chart having a plurality of optically dis-similar sets of value characters, a price scale for each set of characters, and means for selectively bringing each set of characters and its co-operating price scale into prominence.

3. In a device of the class described, in combination, a chart having value indicating characters printed in different colors, shiftable color screens for rendering said sets of characters legible, a price scale corresponding to each set of characters, and means for shifting one or the other of said screens into operative position and simultaneously bringing the proper price scale into view.

4. In a device of the class described, in combination, a chart having a plurality of optically different sets of price characters, a movable frame carrying a screen for selectively rendering the sets of characters legible, means for moving said frame to selectively bring said screens into reading position, a price scale for each set of characters, and means operative upon movement of said frame for bringing the proper price scale into reading position.

5. In a device of the class described, in combination, a chart housing, a movable chart therein, said chart having optically dis-similar sets of price characters, a frame pivoted within said housing and carrying a plurality of screens and price scales, and means for moving said frame to selectively shift said screens and price scales into operative position.

6. In a weighing scale, in combination, a cylindrical chart having value indications printed thereon in different colors and occupying the same chart area, a distinctively different price scale for the value characters of each color, and means for reading the characters of each color in conjunction with the co-operating price scale.

7. In a weighing scale, in combination, a revoluble cylindrical chart having value characters in different colors, a frame pivoted on the axis of revolution of said chart, color screens carried by said frame and adapted to be brought into operative position by movement thereof, a price scale for the value characters of each color, and means whereby said price scales are selectively brought into reading position upon movement of said frame.

8. In a weighing scale, in combination, a chart having characters printed thereon in two different colors, color screens through which said characters may be selectively read, and a price scale mounted in juxtaposition to each color screen to be read in conjunction with the characters legible therethrough each of said price scales containing a distinctive assortment of prices.

9. In a weighing scale, in combination, a revoluble cylindrical chart having value characters in different colors, a frame pivoted on the axis of revolution of said chart, color screens carried by said frame and adapted to be selectively brought into operative position by movement thereof, and a price scale adjacent each screen.

10. A computing scale comprising in combination, a chart and means for automatically displacing the same in accordance with an applied load, said chart having a group of sets of progressive numbers of one color thereon, said sets representing the products of the weight of applied loads and factors per unit weight of the commodity, said chart having also a group of sets of progressive numbers thereon of a color different from the first mentioned color, said second mentioned group of sets representing the products of the weight of applied loads and factors per unit weight different from the factors per unit weight of the first mentioned group of sets, said first and second mentioned sets of numbers overlapping each other, and means for rendering sets of each group predominantly visible with respect to sets of the other group.

CLARENCE H. HAPGOOD.